United States Patent [19]

Ishida

[11] 4,367,968
[45] Jan. 11, 1983

[54] BALL JOINT

[75] Inventor: Kunio Ishida, Yokohama, Japan

[73] Assignee: Tokico Ltd., Kawasaki, Japan

[21] Appl. No.: 200,063

[22] Filed: Oct. 23, 1980

[30] Foreign Application Priority Data

Oct. 29, 1979 [JP] Japan .................. 54/149933[U]

[51] Int. Cl.³ .................. F16 3/00; F16C 11/00; F16D 1/12
[52] U.S. Cl. .................. 403/122; 403/379
[58] Field of Search .................. 403/53, 76, 379, 77, 403/90, 122

[56] References Cited

U.S. PATENT DOCUMENTS

| | | | |
|---|---|---|---|
| 3,527,485 | 9/1970 | Goward et al. | 285/305 |
| 3,698,747 | 10/1972 | Wing et al. | 285/305 |
| 4,145,076 | 3/1979 | Snow | 285/305 X |
| 4,222,680 | 9/1980 | Browning | 403/90 X |

FOREIGN PATENT DOCUMENTS

| | | |
|---|---|---|
| 464438 | 8/1928 | Fed. Rep. of Germany . |
| 483103 | 9/1929 | Fed. Rep. of Germany . |
| 7432114 | 9/1974 | Fed. Rep. of Germany . |
| 205689 | 10/1923 | United Kingdom . |
| 258201 | 9/1926 | United Kingdom . |
| 264575 | 1/1927 | United Kingdom . |
| 329749 | 5/1930 | United Kingdom . |
| 352605 | 7/1931 | United Kingdom . |
| 544759 | 4/1942 | United Kingdom . |
| 1170011 | 11/1969 | United Kingdom . |
| 1354985 | 5/1974 | United Kingdom . |
| 1535955 | 4/1976 | United Kingdom . |

*Primary Examiner*—Wayne L. Shedd
*Attorney, Agent, or Firm*—Wenderoth, Lind & Ponack

[57] ABSTRACT

A ball joint includes a ball member having a spherical end, and a socket member having a recess for rockingly receiving therein the spherical end of the ball member. At least one pin is mounted on the socket member and has opposite ends which pass through aligned openings formed in the socket member. A central portion of the pin slidingly engages with the spherical surface of the spherical end of the ball member thereby retaining the spherical end of the ball member.

4 Claims, 9 Drawing Figures

BALL JOINT

BACKGROUND OF THE INVENTION

This invention relates to a ball joint including a ball member having a spherical end, and a socket member having a recess for rockingly receiving the spherical end of the ball member.

The ball joint further includes means for retaining the spherical end of the ball member in the recess of the socket member, and various types of retaining means have been proposed. However, such proposals are objectable with regard to fabricating or assembling operations. Further, it also has been proposed to fabricate the socket member of a synthetic resin material with the opening of the recess being smaller than the diameter of the spherical end of the ball member such that the spherical end of the ball member can forcibly pass through the opening of the recess in assembling the ball joint. However, the spherical end of the ball member cannot reliably be retained in the recess.

SUMMARY OF THE INVENTION

An object of the invention is to provide a ball joint avoiding the aforementioned shortcomings in the prior art ball joints.

The ball joint according to the invention includes at least one pin mounted on the socket member with the opposite ends thereof being mounted in openings formed in the socket member and the central portion of the pin slidably engaging the spherical surface of the spherical end of the ball member to retain the spherical end in the recess.

Preferably, a generally U-shaped pin member having generally two parallel legs is mounted on the socket member with respective central portions of the legs slidably engaging with the spherical end at diametrically opposite locations thereof.

The invention will now be explained in detail with reference to accompanying drawings exemplifying various embodiments of the invention.

DETAILED DESCRIPTION OF THE PREFERRED EMBODIMENTS

Figure 1:
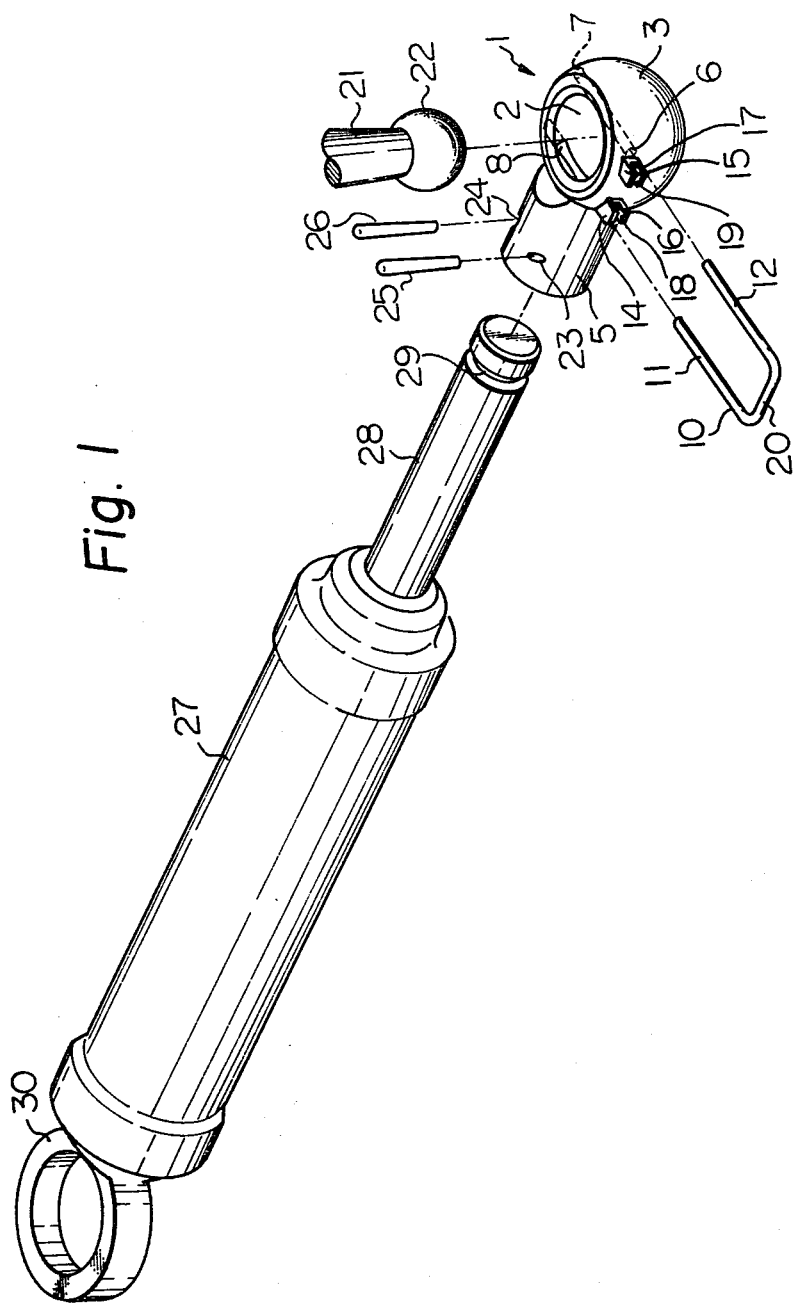
FIG. 1 is a perspective exploded view of a ball joint according to the invention.
Figure 2:
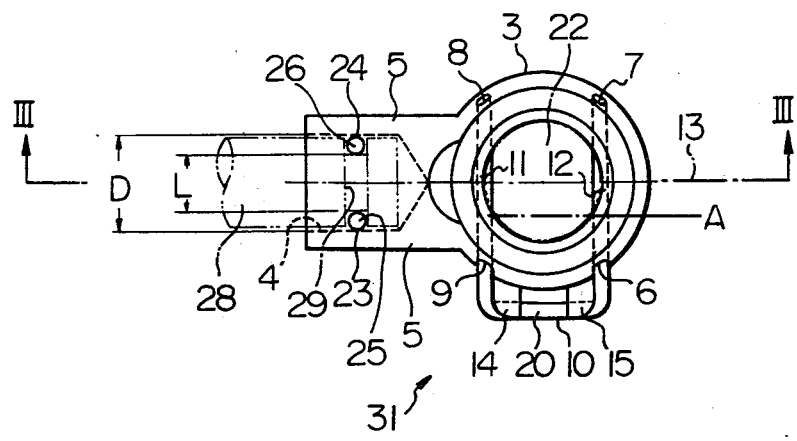
FIG. 2 is a plan view of the ball joint of FIG. 1.
Figure 3:
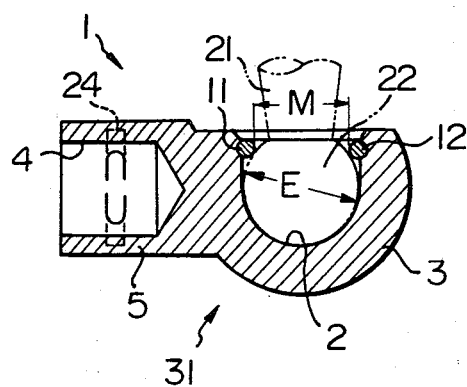
FIG. 3 is a sectional view taken along line III—III in FIG. 2.
Figure 4:
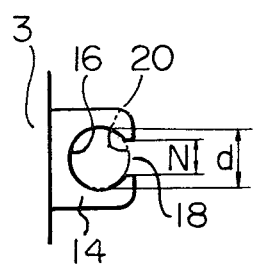
FIG. 4 is a partial side view of a socket member of FIG. 2.

The ball joint illustrated in FIGS. 1–4 comprises a socket member 1 formed of such as a synthetic resin and including a generally semi-spherical portion 3 and a generally cylindrical portion 5. A recess 2 having a semi-spherical bottom surface is formed in the semi-spherical portion 3, and a bore 4 is formed in the cylindrical portion 5.

There are provided in the semi-spherical portion 3 openings 6, 7, 8 and 9 according to the invention. The openings 6 and 7 and the openings 8 and 9 align respectively and the axis of the openings 6 and 7 is generally parallel to the axis of the openings 8 and 9. Preferably, the axis of the openings 6 and 7 is perpendicular to the vertical and horizontal axis of the socket member 1 as viewed in FIG. 3. The horizontal axis of the socket member 1 is depicted by the numeral 13 in FIG. 2.

A generally U-shaped pin member 10 having two generally parallel legs 11 and 12 and a central portion 20 is inserted into the openings 6, 7, 8 and 9 with the opposite end portions of respective legs 11 and 12 being received in and supported by the openings 6, 7, 8 and 9. The central portions of respective legs 11 and 12 slidably engage with the spherical surface of a spherical end 22 of a ball member 21. The spherical end 22 is rockingly received in the recess 2 of the socket 1 and does not escape out of the recess 2.

There are provided on the outer surface of the semi-spherical portion 3 projections 14 and 15 acting as retainers. The projections 14 and 15 respectively have openings 16 and 17 with a diameter corresponding to that of the pin member 10, and cut-out portions 18 and 19 respectively for passing therethrough the central portion 20 of the pin member 10 in mounting or dismounting the pin member 10 onto or from the semi-spherical portion 3.

The cylindrical portion 5 of the socket member 1 has openings 23 and 24 and openings which are not numbered and aligning respectively with the openings 23 and 24 for receiving pins 25 and 26 respectively. The bore 4 in the cylindrical portion 5 receives therein such as a rod member 28 of a gas spring 27 which is mounted on such as a body of an automobile through a mounting ring 30 of the gas spring 27. There is provided in the rod member 28 an annular groove 29 for tightly engaging with the pins 25 and 26 when the rod member 28 is fitted in the bore 4 of the cylindrical portion 5 and pins 25 and 26 are inserted through the openings 23 and 24. The ball member 21 is connected to such as a lift back door of the automobile.

In assembling a ball joint 31 having the aforesaid construction, firstly, the two legs 11 and 12 are inserted into the openings 6 and 9 respectively until the tip ends of respective legs 11 and 12 are located on a line A (FIG. 2), then, the rod member 28 of the gas spring 27 is inserted into the bore 4 of the cylindrical portion 5 and is secured thereto by inserting the pins 25 and 26 into the openings 23 and 24 respectively. The ball end 22 of the ball member 21 which is secured to the lift back door of the automobile is inserted into the recess 2 of the socket member 1, and the pin member 10 is further pushed forward such that the tip ends of respective legs 11 and 12 of the pin member 10 are fitted in the openings 7 and 8. The central portion 20 of the pin member 10 is received in the openings 16 and 17 of the projections 14 and 15 and is retained thereby. Preferably, the projections 14 and 15 are formed integrally with the socket member 1 which is formed of a synthetic resin, so that the central portion 20 of the pin member 10 can easily pass through the cut-out portions 18 and 19 and can be resiliently retained in the assembled condition.

Figure 5:
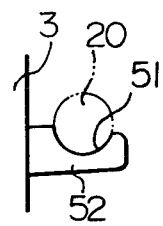
FIG. 5 is a view similar to FIG. 4 but showing a modified form.

FIG. 5 shows a modified form wherein one or more projections 52 are formed integrally with the semi-spherical portion 3. A recess 51 is formed on the projection 52 to resiliently engage with the central portion 20 of the pin member 10.

Figure 6:
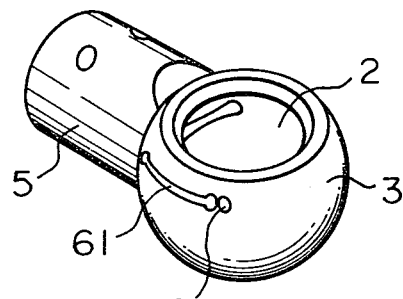
FIG. 6 is a perspective view of a modified socket member.

In FIG. 6, there is formed in the outer surface of the semi-spherical portion 3 a groove 61 for resiliently receiving therein and retaining the central portion 20 of the pin member 10.

Figure 7:
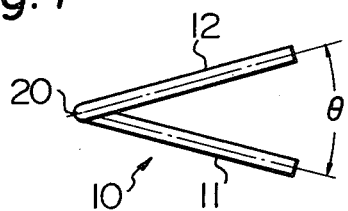
FIG. 7 is a side view of a modified pin member.

FIG. 7 shows a further modified form wherein the pin member 10 is formed of a resilient material and, in the free state, the two legs 11 and 12 extend in different directions as viewed transversely so that the pin member 10 can be retained in the openings 6, 7, 8 and 9 by the resiliency of the pin member.

Figure 8:
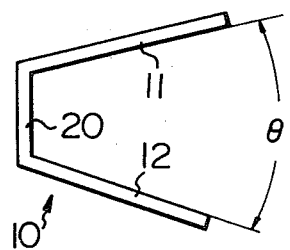
FIG. 8 is a plan view of another pin member.

The embodiment of FIG. 8 is generally similar to that of FIG. 7, but the two legs 11 and 12 of the pin member 10 of FIG. 8 extend divergently as viewed vertically. This embodiment is advantageous over the embodiment of FIG. 7 since the legs 11 and 12 can be guided along radially outer parallel walls extending between the openings 6 and 7 and the openings 8 and 9 in mounting the pin member 10 on the socket member 1.

Figure 9:
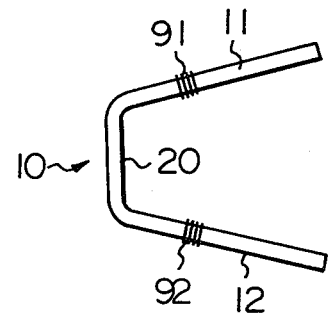
FIG. 9 is a plan view of a further modified pin member.

FIG. 9 shows a further modified form wherein corrugated portions 91 and 92 are respectively formed on the legs 11 and 12 of the pin member 10 so as to tightly engage with openings 9 and 6 thereby retaining the pin member.

Further, it is not necessary that the pin member 10 has two legs as shown in the embodiments above, and the pin member according to the invention may have a single leg. The pin member can be retained at the assembled state by any suitable retaining means.

According to the invention, the ball joint is simple in construction, easy to fabricate assemble, and reliable in operation. By forming the socket member of a synthetic resin, it is possible to reduce the weight of the ball joint, and to eliminate the problems caused of rust, thereby improving the durability of the ball joint.

What is claimed is:

1. A ball joint comprising:

a ball member having a spherical end;

a socket member formed of a synthetic resin material and having a recess;

said spherical end being received in said recess such that said ball member is rockable with respect to said socket member;

a generally U-shaped pin member having two generally parallel legs joined by a central portion;

said legs of said pin member being inserted through respective openings in said socket member, with center portions of said legs engaging the exterior of said spherical end, thereby retaining said spherical end within said recess; and projection means formed integrally with said socket member on the exterior thereof for retaining said pin member in the inserted position thereof, said projection means including resilient means defining an opening portion resiliently receiving therein said central portion of said pin member when said legs of said pin member are inserted into said openings in said socket member.

2. A ball joint as claimed in claim 1, wherein said projection means comprise two projections integrally formed with said socket member of said synthetic resin material, each said projection including therein a said opening portion comprising an opening of a size to receive said central portion of said pin member when said pin member is in the fully inserted position thereof and a cut-out portion extending through said projection into said opening, said cut-out portion being of a size to resiliently deform to allow passage therethrough into said opening of said central portion of said pin member.

3. A ball joint as claimed in claim 2, wherein said each said opening has a generally circular cross-sectional configuration.

4. A ball joint as claimed in claims 1, 2 or 3, wherein the outer surface of said spherical end rockably contacts the surface of said socket member defining said recess.

* * * * *